US005656196A

United States Patent [19]

Tsuda et al.

[11] Patent Number: 5,656,196

[45] Date of Patent: Aug. 12, 1997

[54] FERROFLUID HAVING IMPROVED OXIDATION RESISTANCE

[75] Inventors: Shiro Tsuda, Chiba; Mayumi Takayama, Tokawa-machi, both of Japan

[73] Assignee: Ferrotec Corporation, Japan

[21] Appl. No.: 356,519

[22] Filed: Dec. 15, 1994

[51] Int. Cl.$^6$ .............................. H01F 1/44; C09K 3/00; C09K 15/00

[52] U.S. Cl. .............................. 252/62.52; 252/62.54

[58] Field of Search .............................. 252/62.52, 62.53, 252/62.54, 62.56, 62.51

[56] References Cited

U.S. PATENT DOCUMENTS

| | | | |
|---|---|---|---|
| Re. 32,573 | 1/1988 | Furumura et al. | 252/62.52 |
| 3,764,540 | 10/1973 | Khalafalla et al. . | |
| 4,485,024 | 11/1984 | Furumura et al. | 252/62.52 |
| 4,608,186 | 8/1986 | Wakayama et al. | 252/62.52 |
| 4,624,797 | 11/1986 | Wakayama et al. | 252/62.52 |
| 4,626,370 | 12/1986 | Wakayama et al. | 252/62.52 |
| 4,701,275 | 10/1987 | Duminy-Kovarik | 252/62.52 |
| 4,701,276 | 10/1987 | Wyman | 252/62.52 |
| 4,812,249 | 3/1989 | Duminy-Kovarik | 252/62.52 |
| 4,846,985 | 7/1989 | Rizvi et al. | 252/47.5 |
| 4,938,886 | 7/1990 | Lindsten et al. | 252/62.51 |
| 5,064,550 | 11/1991 | Wyman | 252/62.52 |

FOREIGN PATENT DOCUMENTS

| | | |
|---|---|---|
| 2-239603 | 9/1990 | Japan . |

*Primary Examiner*—Melissa Bonner
*Attorney, Agent, or Firm*—Finnegan, Henderson, Farabow, Garrett & Dunner, L.L.P.

[57] ABSTRACT

The present invention relates to a ferrofluid composition having improved oxidation resistance, which contains a carrier liquid, magnetic particles in a stable colloidal suspension, and from about 5% to about 50% by weight of an antioxidant.

19 Claims, No Drawings

FERROFLUID HAVING IMPROVED OXIDATION RESISTANCE

BACKGROUND OF THE INVENTION

The present invention relates to a ferrofluid composition having improved oxidation resistance and a method for increasing the gelation time of a ferrofluid.

Super paramagnetic fluids, commonly referred to as ferrofluids, are colloidal suspensions of magnetic particles suspended in a carrier liquid. The magnetic particles are suspended in the carrier liquid by a dispersing agent which attaches to the surface of the magnetic particles to physically separate the particles from each other. Dispersing agents, or dispersants, are molecules which have a polar "head" or anchor group which attaches to the magnetic particle and a "tail" which extends outwardly from the particle surface.

Magnetic fluids have a wide variety of industrial and scientific applications which are known to those skilled in the art. Magnetic fluids can be positioned and held in space, without a container, by a magnetic field. This unique property has led to the use of magnetic fluids as liquid seals which have low drag torque and which do not generate particles during dynamic operation, as conventional lip seals are wont to do. Specific uses of magnetic fluids which illustrate the present invention and its advantages include the use of magnetic liquids as components of exclusion seals for computer disk drives, seals and lubricants for bearings, for pressure and vacuum sealing devices, for heat transfer and damping fluids in audio speaker devices and for inertia damping.

In many sealing applications which use a magnetic colloid sealing system, it is particularly advantageous to have a magnetic colloid with the lowest possible viscosity to reduce frictional heating. This, in turn, reduces the temperature of the fluid in the seal and consequently the evaporation rate of the carrier liquid, thereby prolonging the life of the seal. Ideally, magnetic fluids suitable for sealing disk drives for computers have both a low viscosity and a low evaporation rate.

These two physical characteristics of magnetic fluids are primarily determined by the physical and chemical characteristics of the carrier liquid. According to the Einstein relationship, the viscosity of an ideal colloid is:

$$(N/N_0)=1+\alpha\Phi$$

wherein

N is the colloid viscosity;

$N_0$ is the carrier liquid viscosity;

$\alpha$ is a constant; and $\Phi$ is the disperse phase volume.

The saturation magnetization of magnetic fluids is a function of the disperse phase volume of magnetic material in the magnetic fluid. In magnetic fluids, the actual disperse phase volume is equal to the phase volume of magnetic particles plus the phase volume of the attached dispersant.

Magnetic particle size and size distribution, along with the physical and chemical characteristics of the dispersant, also affect the viscosity and, consequently, the evaporation rate of magnetic fluids.

There are, however, a number of ways that a ferrofluid can lose its effectiveness, such as evaporation of the carrier liquid. Oxidative degradation, which occurs when the fluid is heated in the presence of air, is another problem.

Oxidative degradation of the magnetic particles causes the particles to lose their magnetic character due to the formation on the surface of the particles of a non-magnetic or low magnetic oxide layer. Attempts to solve this problem, i.e., prevent oxidation of the magnetic particles, are described in U.S. Pat. Nos. 4,608,186, 4,624,797 and 4,626,370.

In addition to oxidative degradation of the magnetic particles, oxidative degradation of the dispersant is another problem associated with the loss of effectiveness of a ferrofluid. Oxidative degradation of the dispersant increases the particle-to-particle attraction within the colloid, resulting in gelation of the magnetic colloid at a much more rapid rate than would occur in the absence of oxidative degradation. Accordingly, there is a need in the art for a ferrofluid having an improved resistance to oxidative degradation of the dispersant to increase the time until gelation occurs.

SUMMARY OF THE INVENTION

Accordingly, the present invention is directed to a ferrofluid composition having an improved oxidation resistance. Additional features and advantages of the invention will be set forth in the description which follows, and in part will be apparent from the description or may be learned from practice of the invention. The advantages of the invention will be realized and attained by the composition particularly pointed out in the written description and claims.

To achieve these and other advantages and in accordance with the purpose of the invention, as embodied and broadly described, the invention provides a ferrofluid composition having improved oxidation resistance, which contains a carrier liquid, magnetic particles in a stable colloidal suspension, and from about 5% to about 50% by weight of an antioxidant.

There is also provided a method for increasing the gelation time of a ferrofluid, which comprise adding to a ferrofluid from about 5% to about 50% by weight of an antioxidant.

It is to be understood that both the foregoing general description and the following detailed description are exemplary and explanatory and are intended to provide further explanation of the invention as claimed.

DETAILED DESCRIPTION OF THE INVENTION

A first embodiment of the present invention is directed to a ferrofluid composition which has an improved oxidation resistance. In particular, a first embodiment of the present invention is directed to a ferrofluid comprising a carrier liquid, magnetic particles in a stable colloidal suspension, and from about 5% to about 50% by weight of an antioxidant.

Ferrofluids, and methods of making ferrofluids, are generally well-known in the art. U.S. Pat. No. 4,701,276, which is herein incorporated in its entirety by reference, describes ferrofluids and their uses and applications. Ferrofluids generally comprise a carrier liquid and magnetic particles in a stable colloidal suspension.

The carrier liquid used in ferrofluid of the present invention may be any carrier liquid known by those skilled in the art to be useful for ferrofluids. The carrier liquid may be a polar carrier liquid or a nonpolar carrier liquid. The choice of carrier liquid and amount employed is dependent upon the intended application of the ferrofluid and can be readily determined by the skilled artisan based upon the particular desired characteristics of the final ferrofluid. Suitable carrier liquids are disclosed in U.S. Pat. Nos. 4,938,886 and 5,064,550, which are herein incorporated in their entirety by reference.

Illustrative examples of polar carrier liquids in which stable suspensions of magnetic particles may be formed include any of the ester plasticizers for polymers such as vinyl chloride resins. Such compounds are readily available from commercial sources. Suitable polar carrier liquids include: polyesters of saturated hydrocarbon acids, such as $C_6$–$C_{12}$ hydrocarbon acids; phthalates, such as dioctyl and other dialkyl phthalates; citrate esters; and trimellitate esters, such as tri(n-octyl/n-decyl) esters. Other suitable polar carriers include: phthalic acid derivatives, such as dialkyl and alkylbenzyl orthophthalates; phosphates, such as triaryl, trialkyl or alkylaryl phosphates; and epoxy derivatives, such as epoxidized soybean oil.

Nonpolar carrier liquids useful in the practice of the present invention include hydrocarbon oils, in particular, poly(alpha olefin) oils of low volatility and low viscosity. Such oils are readily available commercially. For example, SYNTHANE oils produced by Gulf Oil Company having viscosities of 2, 4, 6, 8 or 10 centistokes (cst) are useful as nonpolar carrier liquids in the present invention.

Preferably, the carrier liquid used in the present invention is a polar carrier liquid. More preferably, the carrier liquid is a trimellitate triester, which are widely used as plasticizers in the wire and cable industry. Most preferably, the carrier liquid is the trimellitate triester available from Aristec Chemical Company under the trade name PX336.

The ferrofluids according to the present invention may contain any magnetic particle suitable for use in ferrofluids, including metal particles and metal alloy particles. Suitable magnetic particles for use in the present ferrofluid include magnetite, gamma iron oxide, chromium dioxide, ferrites, including MnZn ferrites, and various metallic alloys. Preferably, the magnetic particles are magnetite ($Fe_3O_4$) or gamma iron oxide ($Fe_2O_3$). More preferably, the magnetic particles are magnetite. Those skilled in the art are thoroughly familiar with procedures for making magnetite and other suitable magnetic particles.

The amount of magnetic particle employed in the inventive ferrofluid is dependent upon the intended use of the ferrofluid and the optimal amount can be readily determined by one of skill in the art. Preferably, the amount of magnetic particles is from about 1% to about 20% by volume of the ferrofluid. More preferably, the amount of magnetic particles is from about 1% to about 10% by volume of the fluid, most preferably from about 3% to about 5% by volume of the fluid.

Magnetic particles, such as magnetite, in the ferrofluid preferably have an average magnetic particle diameter of between 80 Å and 90 Å, although particles having a larger or smaller magnetic particle diameter may be used as appropriate. One skilled in the art may readily determine the appropriate particle size based upon the intended application of the ferrofluid and other considerations.

The magnetic particles used in the present ferrofluid are coated with a dispersant to form stable colloidal suspensions of the magnetic particles in relatively high molecular weight nonpolar and polar carrier liquids. Suitable dispersants for use in the present ferrofluid are disclosed in U.S. Pat. Nos. 4,938,886 and 5,064,550, incorporated by reference above. One skilled in the art is familiar with these suitable dispersants and how to incorporate them into ferrofluids. Preferably, the dispersant has a carboxyl group as the "head" or anchor group.

The inventive ferrofluid also contains an antioxidant. The antioxidant may be any antioxidant known to those skilled in the art, including hindered phenols and sulfur-containing compounds. One skilled in the art may readily ascertain the suitability of a given antioxidant simply by adding the antioxidant to the ferrofluid and seeing if the gelation time of the fluid is increased relative to that of the fluid without the antioxidant.

Preferably, the antioxidant is an aromatic amine. More preferably, the antioxidant is an alkylaryl amine. Most preferably, the antioxidant is an alkyl diphenylamine, such as the alkyl diphenylamine L-57 available from Ciba-Geigy and OA502 available from Witco.

The antioxidant may be used in any amount effective to increase the gelation time of a ferrofluid with respect to the gelation time of that fluid without the antioxidant. Generally, the amount of antioxidant employed is from about 2% to about 50% by weight of the ferrofluid. Preferably, the amount of antioxidant is from about 5% to about 50% by weight of the ferrofluid, more preferably from about 10% to about 30% by weight. Most preferably, the amount of antioxidant employed is from about 10% to about 20% by weight.

The inventive ferrofluid may be prepared by any of the methods known to those skilled in the art for preparing ferrofluids. Preferably, the antioxidant to be used is simply added to a known ferrofluid, such as the ferrofluid CFF200A available from Ferrotec® Corporation, in an effective amount.

The following examples of the inventive composition are merely illustrative of the invention and should not be construed as limiting. One skilled in the art can make, without undue experimentation, various substitutions and variations and by equivalent means, performing in substantially the same manner, obtain substantially the same results without departing from the teaching and spirit of the invention.

EXAMPLE 1

Effect on gel time by the addition of an antioxidant to ferrofluid CFF200A (Nippon Ferrofluidics):

The ferrofluid containing the desired quantity of antioxidant OA502 was placed in a glass tube having an inside diameter of 11.8 mm, and outside diameter of 15.0 mm and a length of 8.3 mm. A sufficient volume of ferrofluid was used such that the tube contained 3 mm of material.

The tube was then placed in a hole drilled in an aluminum plate (15.8 cm×15.8 cm×4.0 mm), the hole being sized such that the tube fit snugly. The aluminum plate was then placed in an oven at a controlled temperature of 175°±2° C. The temperature at the sample was 156°±5° C.

The tube containing the ferrofluid was periodically removed from the oven, cooled rapidly, and examined for signs of gel formation. A small magnet was placed at the meniscus of the fluid in the tube. When the material was no longer attracted to the portion of the magnet held above the meniscus, the fluid was considered to have gelled.

Repeated experiments utilizing the same ferrofluid composition at the same temperature showed that gel times were repeatable to within ±20%. The results are presented in the following Table.

| Amount of antioxidant (%) | Gel time (hours) |
|---|---|
| 0 | 285 |
| 2 | 470 |
| 5 | 610 |

-continued

| Amount of antioxidant (%) | Gel time (hours) |
|---|---|
| 10 | 780 |
| 20 | 910 |
| 30 | 780 |
| 40 | 620 |
| 50 | 380 |

Although preferred embodiments of the invention are described herein in detail, it will be understood by those skilled in the art that variations may be made thereto without departing from the spirit of the invention or the scope of the appended claims.

What is claimed is:

1. A ferrofluid composition comprising a carrier liquid, magnetic ferrite particles in stable colloidal suspension, and from about 5% to about 50% by weight of the ferrofluid of an antioxidant to improve the ferrofluid's resistance to oxidation of a dispersant.

2. The ferrofluid of claim 1, wherein the antioxidant is present in an amount of from about 10% to about 30% by weight.

3. The ferrofluid of claim 1, wherein the antioxidant is present in an amount of from about 10% to about 20% by weight.

4. The ferrofluid of claim 1, wherein the antioxidant is an aromatic amine.

5. The ferrofluid of claim 4, wherein the antioxidant is an alkylaryl amine.

6. The ferrofluid of claim 5, wherein the antioxidant is an alkyl diphenylamine.

7. The ferrofluid of claim 1, wherein the carrier liquid is a polar carrier liquid.

8. The ferrofluid of claim 7, wherein the carrier liquid is an ester plasticizer.

9. The ferrofluid of claim 8, wherein the carrier liquid is a trimellitate triester.

10. The ferrofluid of claim 1, wherein the carrier liquid is a nonpolar carrier liquid.

11. The ferrofluid of claim 10, wherein the carrier liquid is a hydrocarbon oil.

12. The ferrofluid of claim 11, wherein the carrier liquid is a poly(alpha olefin) oil.

13. The ferrofluid of claim 1, wherein the magnetic particles are magnetite particles.

14. A method of improving the resistance to oxidative degradation of a ferrofluid comprising a carrier liquid and magnetic ferrite particles in stable colloidal suspension, which comprises adding to the ferrofluid from about 5% to about 50% by weight of the ferrofluid of an antioxidant to inhibit oxidation of a dispersant and thereby increase the time required for gelation of the ferrofluid.

15. The method of claim 14, wherein the antioxidant is added to the ferrofluid in an amount of from about 10% to about 20% by weight.

16. The method of claim 14, wherein the antioxidant is an alkyl diphenylamine.

17. The method of claim 14, wherein the carrier liquid is a trimellitate triester.

18. The method of claim 14, wherein the magnetic particles are magnetite particles.

19. A ferrofluid containing from about 5% to about 50% by weight of the ferrofluid of an antioxidant to improve the ferrofluid's resistance to gelation.

* * * * *

UNITED STATES PATENT AND TRADEMARK OFFICE

CERTIFICATE OF CORRECTION

PATENT NO. : 5,656,196
DATED : August 12, 1997
INVENTOR(S) : Shiro TSUDA et al.

It is certified that error appears in the above-indentified patent and that said Letters Patent is hereby corrected as shown below:

claim 1, column 5, line 19, "oxidation of a dispersant" should read --gelation--.

claim 14, column 6, line 17, delete "inhibit oxidation of a dispersant and thereby".

Title Page, column 1, item [75], line 2 under "Inventors", "Tokawa-machi" should read --Chiba--.

Signed and Sealed this

Twenty-first Day of October 1997

Attest:

BRUCE LEHMAN

*Attesting Officer* *Commissioner of Patents and Trademarks*